United States Patent
Mattos et al.

(10) Patent No.: US 7,359,407 B1
(45) Date of Patent: Apr. 15, 2008

(54) DATA INTERFACE THAT IS CONFIGURABLE INTO SEPARATE MODES OF OPERATION FOR SUB-BIT DE-SKEWING OF PARALLEL-FED DATA SIGNALS

(75) Inventors: Derwin W. Mattos, San Jose, CA (US); Walter F. Bridgewater, San Jose, CA (US); Michael H. Herschfelt, Felton, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 974 days.

(21) Appl. No.: 10/228,640

(22) Filed: Aug. 27, 2002

(51) Int. Cl.
*H04J 3/06* (2006.01)
(52) U.S. Cl. .................. 370/509; 370/516; 375/371; 713/375; 713/400; 714/700
(58) Field of Classification Search ........... 370/419, 370/463, 503, 506, 508, 516, 517, 518, 519, 370/524, 509; 710/58, 100, 105, 125; 375/354, 375/371; 714/699, 700, 701; 713/500, 503
See application file for complete search history.

(56) References Cited

U.S. PATENT DOCUMENTS

| | | | | |
|---|---|---|---|---|
| 5,313,501 A | * | 5/1994 | Thacker ................. | 375/369 |
| 5,461,621 A | * | 10/1995 | Little ..................... | 370/470 |
| 5,467,346 A | * | 11/1995 | Ito et al. ................ | 370/403 |
| 5,870,446 A | * | 2/1999 | Mc Mahan et al. ..... | 375/371 |
| 6,031,847 A | * | 2/2000 | Collins et al. .......... | 370/508 |
| 6,044,121 A | * | 3/2000 | Nolan et al. ............ | 375/354 |
| 6,079,035 A | * | 6/2000 | Suzuki et al. .......... | 714/700 |
| 6,336,192 B1 | * | 1/2002 | Sakamoto et al. ...... | 713/503 |
| 6,473,439 B1 | * | 10/2002 | Zerbe et al. ............ | 370/503 |
| 6,526,106 B1 | * | 2/2003 | Migita ................... | 375/354 |
| 6,680,636 B1 | * | 1/2004 | Parry et al. ............. | 327/161 |
| 6,687,840 B1 | * | 2/2004 | Drottar et al. .......... | 713/401 |
| 6,701,140 B1 | * | 3/2004 | Stine ...................... | 455/260 |
| 6,704,882 B2 | * | 3/2004 | Zabinski et al. ........ | 713/401 |

(Continued)

OTHER PUBLICATIONS

Cam, Richard and Tuck, Russ, "System Packet Interface Level 4 (SPI-4) Phase 2: OC-192 System Interface for Physical and Link Layer Devices", The Optical Internetworking Forum, Jan. 2, 2001.*

(Continued)

*Primary Examiner*—Hassan Kizou
*Assistant Examiner*—Brian T O'Connor
(74) *Attorney, Agent, or Firm*—Kevin L. Daffer; Daffer McDaniel, LLP

(57) ABSTRACT

A data interface is provided that can de-skew data signals by taking into account different skewing effects on each data signal. The data interface can be used, for example, in a communication system and can be configured to operate in one of three possible modes of operation. In the first mode, de-skewing is fixed prior to the sample logic. In the second mode, de-skewing is periodically changed automatically as the amount of skew changes based on training signals that are periodically sent into the data interface. The combination of the data phase count and the positive and negative clock width pulse counts will then determine where the final transition or edge of each data signal is to be placed within a bit. The third mode of operation involves an override or programmatic modification of the second mode of operation based on values stored in a register.

15 Claims, 11 Drawing Sheets

U.S. PATENT DOCUMENTS

| | | | |
|---|---|---|---|
| 6,704,890 B1* | 3/2004 | Carotti et al. | 714/700 |
| 6,980,616 B1* | 12/2005 | Nakano et al. | 375/364 |
| 7,206,955 B2* | 4/2007 | Drottar et al. | 713/401 |
| 7,221,126 B1* | 5/2007 | Williamson et al. | 370/503 |
| 2002/0091885 A1* | 7/2002 | Hendrickson et al. | 710/100 |
| 2003/0053489 A1* | 3/2003 | Zerbe et al. | 370/503 |
| 2005/0069041 A1* | 3/2005 | Lincoln | 375/257 |

OTHER PUBLICATIONS

"Using the Virtex Delay-Locked Loop," © 2001 Xilinx, Inc., pp. 1-15.

* cited by examiner

DATA INTERFACE THAT IS CONFIGURABLE INTO SEPARATE MODES OF OPERATION FOR SUB-BIT DE-SKEWING OF PARALLEL-FED DATA SIGNALS

BACKGROUND OF THE INVENTION

1. Field of the Invention

This invention relates to a data interface that receives data signals and aligns those signals at an optimal sample location between clock edges of a sampling clock. The data interface can be included within a network communication system and, more particularly, within a packet framer or packet mapper to receive transmitted data from link layer devices of a node or communication network, and for aligning the transmitted data within bit locations of the frame defined by the edges of the sampling clock.

2. Description of the Related Art

The following descriptions and examples are not admitted to be prior art by virtue of their inclusion within this section.

In order to successfully implement a synchronous system, it is beneficial to properly align a sampling clock to the data being sampled. This entails making sure that if a data transition is to be sampled, the data transition occurs at the proper moment between clock edges or transitions. Synchronous circuits therefore rely on the data transitioning and remaining stable from at least a "set-up" time before the clock transitions until at least a "hold time" after the clock transitions.

Most synchronous systems have significant set-up and hold time requirements. As the clock transition frequency increases, the margin of time in which data can transition between the set-up and hold times decreases proportionally. High speed synchronous systems can ill-afford significant skewing or jitter of the clocking signal relative to data signal transitions.

In addition to clock signal skewing and jitter problems, many clocks also experience duty cycle fluctuations. For example, a clocking signal which has a longer duration positive pulse than its negative pulse will cause an irregular data signal sampling if data is sampled at each transition of the clocking signal. Most high-speed synchronous systems will use both edges of the clocking signal to sample data or possibly multiple phases of those edges. If the positive pulse is less than the negative pulse (or vice-versa), then the sampling margin for data transitions will be different between successive pairs of clock edges.

Although numerous techniques are used in an effort to minimize skewing, jitter, and duty cycle fluctuations, most techniques cannot in all conditions ensure data signal transitions occur in the critical sampling margin, or range. For example, in the case where data signals might be those sent across a communication system or network, the clock signal could possibly be recovered from the data signal and therefore suffer the same skewing and jitter problems of the data signal.

The problem of adjusting skew is sometimes addressed by generating delayed versions of the clock signal and selecting an appropriate phase that is most appropriate to sample the data. A retiming circuit is therefore needed, which involves possibly analog circuit and a relatively large consumption of power. While the problem is generally prevalent in all synchronously controlled subsystems, it can arise in communication systems that rely on synchronous operation/ sampling. Regardless of the application, synchronous systems (or synchronous systems in a communication system setting) employ a data interface. The data interface optimally receives transmitted data properly timed with respect to a clocking signal. The transmitted data can be sent from, for example, a processor attributed to a node or possibly from another processor separated from the data interface (e.g., framer within a communication system) by a network transmission link. In a communication system example, the Optical Internetworking Forum ("OIF") recognized the data skewing problem and specified the operation of a communication system framer at the receive port of the framer by defining a system packet interface ("SPI") de-skewing mechanism. For example, SPI can define a packet-over-SONET ("POS") physical device that receives transmitted data into the SPI of the SONET framer. The SPI-4 OIF agreement allows for a skew between the data and clock signals for as much as plus or minus one cycle of the clock signal.

A mechanism is thereby needed which can detect skewing within one half clock cycle (within one bit location) and can essentially de-skew the sub-bit skew. The desired mechanism should, therefore, be able to essentially move a data transition away from the clock edges and optimally near a midpoint between clock transitions. The mechanism should be one that can be used as a flexible interface, which can be adjusted manually or programmably when deemed necessary. This will allow the data to be sampled well within the optimal sampling margins. The desired de-skew interface or de-skew mechanism should be applicable to any synchronous system, including a synchronous system used in communication system for transferring packets of data between nodes, such systems include gateways, routers, computer workstations, switches, and/or general multimedia devices which rely upon accurate framing and de-framing of synchronous data.

SUMMARY OF THE INVENTION

The problems outlined above are in large part solved by an improved data interface. The data interface may or may not be embodied within a communication system. The data interface is optimally configured to operate in one of three possible modes of operation.

According to the first mode, data transitions can simply be delayed relative to one another in order to achieve equalization across a plurality of data signals prior to placing those signals into a synchronous sampling circuit. According to the second mode, a training pattern having transitions which occur at the same time can be fed into a series of delay elements. Each data signal and, particularly, the concurrent training transition within each data signal is thereby delayed in a sequentially increasing fashion and represented as a phase delay number dependent on which output from the series of delay elements is being used. The phase delay number sampled by an edge of the clocking signal is used in conjunction with a positive and negative clock width phase delay number to determine where, between clock transitions, each transition of the data signal must be placed. Thus, the second mode constitutes a data pointer which picks an optimal phase delay number dependent on the clock transition time and the clock pulse widths, and assigns that phase delay number to the corresponding data signal for subsequent data signals sent in parallel to the data interface. In this fashion, any subsequent data signals can be assigned an appropriate delay amount in order to ensure transitions of those data signals occur within an optimal range between clock signal transitions (i.e., occur at the optimal sampling margin or range). According to the third mode, registers can be used to override, add to, subtract from, or otherwise modify the selected phase delay number in order to pick a new data phase count that might be quite dissimilar from the data phase count selected by the second mode of operation.

The data interface can be any interface which receives parallel-fed data to be used by a sequential subsystem or state machine. The data interface is also equally applicable to receive a single (i.e., non-parallel-fed) data stream. Any skew or jitter on the data signals will be accounted for and assigned a phase delay number depending on the amount of delay for the respective signal. If parallel-fed data is fed into the interface, the phase delay number can be different for each of the parallel-fed data signals. In addition to the phase delay number, the data interface accounts for dissimilar positive and negative clock pulse widths. A difference between a phase delay number (taking into account the dissimilar clock pulse widths) between neighboring clock transitions can, therefore, be assigned to select the optimal phase and therefore the optimal data transitions for each of the parallel-fed data signals. The clock width pulse count in combination with the data phase count is used by, for example, a multiplexer to select a data signal phase having a transition at or near the midpoint between clocking edges (either the positive pulse midpoint or the negative pulse midpoint).

The data interface can be the SPI of, for example, a framer. Thus, the training pattern defined in the SPI-4.2 specification can be periodically used to define the data phase count and the clock width phase count possibly at N intervals of frames received from, for example, the link layer devices and the physical layer ("PHY") devices described in the Open System Interconnection (OSI) model defining communication protocols within a communication system. The data interface can be a part of the PHY attributed to, for example, a framer within a line card. The line card may be used to interconnect a local area network ("LAN") to a wide area network ("WAN"). The line card can also include a media access controller ("MAC") that handles accesses to shared media upon the localized network or LAN.

According to one embodiment, the data interface includes a port and an alignment mechanism. The port can receive a plurality of data signals and a clock signal. The alignment mechanism can operate in one of the three possible modes of operation to adjust transitions of the data signal so that they occur within a time range between a pair of transitions of the clock signal. Preferably, the time range is +/−20% from the midpoint of positive or negative pulses of the clock signal or, more preferably, +/−15% from the midpoint. Regardless of whether the range is +/−20% or +/−15%, the data signal transition is slated for placement within the setup and hold time requirements of the synchronous system—regardless of what the setup and hold times might be.

According to the first mode of operation, the alignment mechanism includes a delay equalizer and a programmable register. The programmable register forwards configuration values to the delay equalizer to adjust the transition and duty cycle of the clock signal.

According to the second mode of operation, the alignment mechanism includes a series of delay elements, sample logic, and set logic. The delay elements forms a sequentially increasing phase delay number for each of the data signals forwarded to a corresponding series of delay elements. The sample logic thereafter generates a data phase count corresponding to the phase delay number that is sampled during a transition of the clock signal. The set logic then picks a new data phase count at which the transition of each of the plurality of data signals is to reside by either adding to or subtracting from the data phase count a phase delay number that places the transition of each of the plurality of data signals at approximately a midpoint between transitions of the clock signal.

According to the third mode of operation, the alignment mechanism may further include a register that is coupled to combine with, modify, or override the phase delay number and/or the clock width phase delay number. The register contains values that can be programmably input by a user possibly during a configuration operation or cycle to modify the latest proper transition positions of the data signals. The result is to pick a new data phase count at which the transition of each of the plurality of data signals occurs at approximately a midpoint between transitions of the clock signal.

According to yet another embodiment, a communication system is provided. The communication system includes a plurality of conductors, a series of delay elements, and a data pointer select circuit. The delay elements are coupled to each of the plurality of conductors, and the data pointer select circuit selects a phase delay from among the series of delay elements. The data pointer select circuit also adjusts the selected phase delay to correspond to approximately a midpoint between a pair of transitions of the clock signal. The communication system is one whereby the plurality of conductors preferably reside on a framer. The framer can receive transmit signals periodically sent from the SPI during a training session, whereby at least a portion of the plurality of transmit signals transitions to a dissimilar logic value within one half cycle of the clock signal.

According to yet a further embodiment, a method is provided. The method is used for de-skewing a data signal according to a set of steps. First, the data signal is delayed an increasing amount. A data phase count is then assigned to each phase of the data signal being delayed. The data phase count is then assigned corresponding to the delayed data signal sampled at a transition of a clock signal. The data phase count is adjusted based on a clock width phase count of the clock signal, and a transition of the data signal is picked corresponding to the adjusted data phase count. Adjusting the phase count includes the steps of calculating the difference between a data phase count between a pair of transitions of the clock signal and using the difference as the clock width phase count. Approximately one half of the clock width phase count can be either added to or subtracted from the assigned data phase count depending on whether the data signal prior to the delaying step is within or outside of a set-up time of a transition of the clock signal.

BRIEF DESCRIPTION OF THE DRAWINGS

Other objects and advantages of the invention will become apparent upon reading the following detailed description and upon reference to the accompanying drawings in which.

Figure 1:
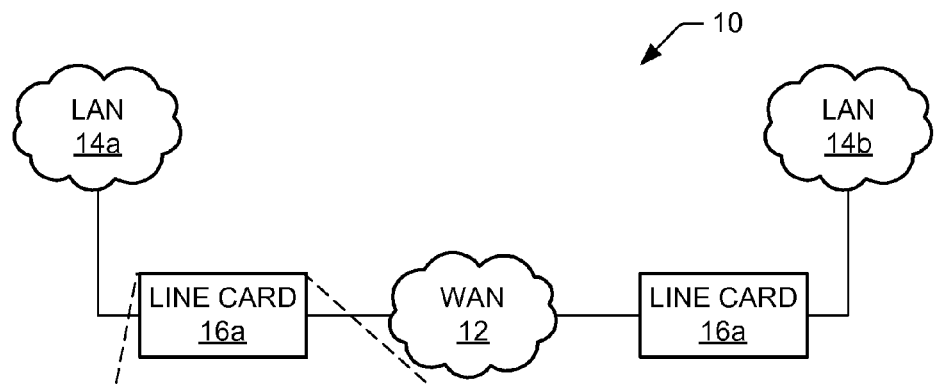
FIG. 1 is plan diagram of a communication system having line cards coupled between, for example, a WAN and respective LANs of an intranet or internet.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Turning now to the drawings, FIG. 1 illustrates one example of a communication system 10. Communication system 10 can include a WAN 12 linked between a pair of LANs 14a and 14b. In order to interface one network to another, a network interface or line card 16 is needed. It is recognized that line card 16 can be configured either as an interface between networks or as an interface between a multimedia device, or computer workstation, and a network. In the example shown, line card 16 provides an interface between networks to connect geographically isolated LANs into a single network over a WAN.

The transmission media for each network can be, for example, an asynchronous or synchronous transmission medium. One example of a synchronous medium is SONET/SDH. While distinct, SONET and SDH are largely compatible standards and, therefore, whenever the term SONET is used, it is also meant to encompass SDH, or vice-versa. If a transmission medium is SONET, then IP traffic sent over, for example, a LAN can be placed directly into a SONET frame using a packet-over-SONET, or POS, framer. Generally speaking, the MAC within the POS checks the destination IP address of the packet and forwards it over the SONET link only if it needs to be forwarded. Otherwise, the packet is dropped out of the line card buffer.

The generalized buffer, framer, or mapper that performs the routing functions within a line card can be implemented in many ways. If SONET is used, then a POS forms a portion of the line card 16. However, it is understood that the present line card functionality is not limited to SONET transmission but instead is generalized to any data interface which receives data that may be skewed relative to a synchronizing clocking signal. A prevalent form of skewing may exist between, for example, parallel-fed data. The data can be a part of data sent across the transmission medium (either serialized or de-serialized), or can simply be data sent from an upstream subsystem without invoking network communication and/or network protocols.

Figure 2:
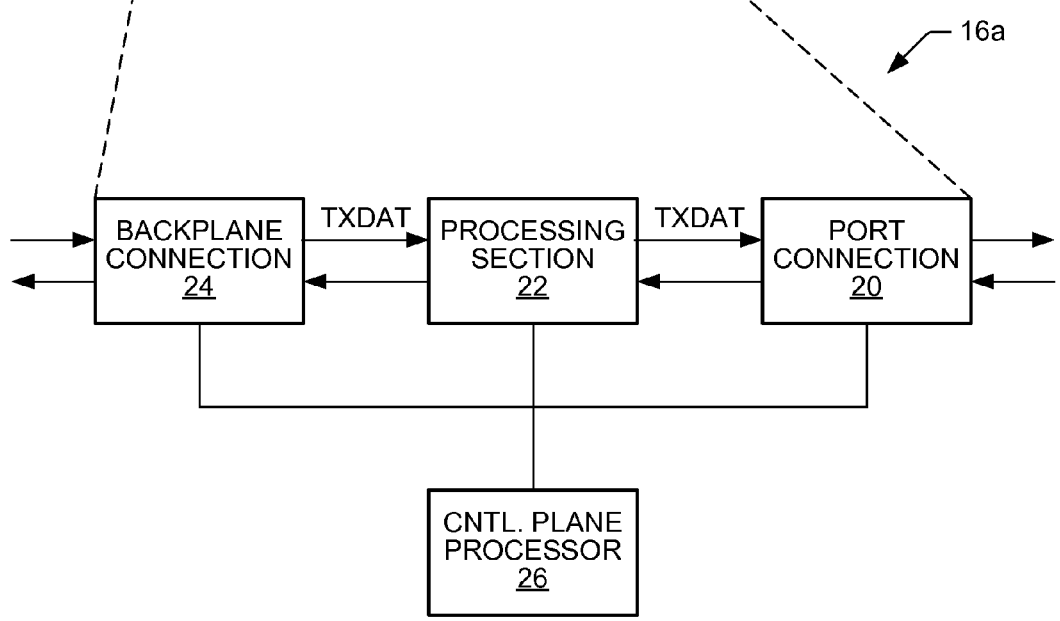
FIG. 2 is a block diagram of a line card of FIG. 1 having physical layer devices, such as a framer/mapper port, controlled by link layer devices, such as a processor.

FIG. 2 illustrates line card 16a and, more particularly, the various subsystems used to send and receive packets of information between networks. A line card 16 can have four subsystems: a port connection 20, a processing section 22, a backplane connection 24, and a control plane processor or network control unit 26. Backplane connection 24 can essentially consists of a PHY plus a MAC. Processing section 22 usually has a network coprocessor and possibly several network search engines, and port connection 20 may contain a framer or mapper. If a connection is made to a FOT, the port connection 20 mapper/framer is a POS plus a PHY. Control plane processor 26 can be any form of CPU, such as a PowerPC available from Motorola Corporation.

Backplane connection 24 provides connection to, for example, a LAN 14 or, in the alternative, to possibly the backplane of a workstation if the line card is simply associated with a termination device instead of another network. Backplane connection 24 supports numerous types of protocols ranging from the PCI bus (in the case of a workstation) to Fibre Channel or Ethernet (in the case of a connection to another network). The MAC associated with backplane connection 24 recovers the IP packet from, for example, the Ethernet frame and outputs the packet to the processing section 22 over, for example, a 16-bit parallel interface. The inputs/outputs of both channels of the MAC are thereby combined into a single parallel data stream, shown as TXDAT.

Processing section 22 receives TXDAT from the backplane connection 24 and reads the IP header from the buffered packet and presents it to the network coprocessor within processing section 22. The network coprocessor can use various search engines to look up whether the packet should be forwarded to the control plane processor 26. Thus, processing section 22 makes the determination of whether to accept or reject a packet by either forwarding the packet to port connection 20 or invalidating the pointer to the packet.

If port connection 20 serves a FOT such as, for example, OC-192, the POS interprets the channel information to create STS frames within the SONET payload. Additionally, the POS also handles the path overhead, line overhead, and section overhead associated with the SONET frame. Port connection 20, therefore, contains a PHY which converts the 16-bit parallel input to a differential serial bitstream that is sent to electro-optical converters which drive the FOT compatible with, for example, the OC-192 standard.

Figure 3:
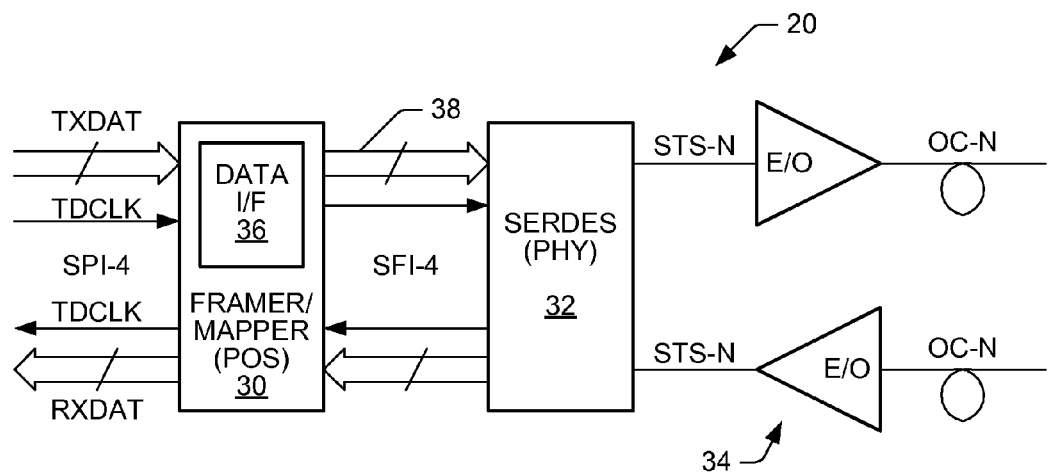
FIG. 3 is a block diagram of the framer/mapper port connected between a system packet interface ("SPI") for sending/receiving data to/from the link layer devices and a SFI for sending/receiving data to/from, for example, a fiber optic transmission system.

FIG. 3 illustrates in more detail port connection 20. In the example shown, port connection 20 or connection 24 is essentially an interface one or more serial fed data stream (TXDAT) shown to be sent, for example, and received within optical fibers. Port connection 20 essentially contains three subcomponents: a framer/mapper 30, a serializer/de-serializer ("SERDES") 32, and electro-optical devices 34. Electro-optical devices 34 are required only if a fiber optic transmission system is used. In the example shown, SONET/SDH or related transmission protocol may be used where the framer/mapper 30 is POS that couples the SPI to the system fiber interface SFI. SERDES 32 can then convert the 16-bit parallel input from framer 30 to a differential serial bitstream at 9.952 Gpbs (approximately 10 Gbps) if SDS-192 and OC-192 are employed. Conversely, SERDES 32 converts a 10 Gbps serial bitstream on the receive path into a 16-bit parallel bitstream, where each data signal can transition at roughly 9.952 Gbps/16 or 622 Mbps.

Contained within framer/mapper 30 can be a data interface 36. Interface 36 receives the parallel-fed data signals labeled TXDAT and a clocking signal labeled TDCLK ideally synchronized with transitions on the data signals. A portion of data interface 36 constitutes a sample circuit which relies upon optimal synchronous relationship between the sampling clock (TDCLK) and each of the corresponding transitions within the parallel-fed data. Unfortunately, however, transitions of the sampling clock are skewed relative to transitions within the parallel-fed data.

Present data interface 36 is, therefore, designed to de-skew transitions of the parallel-fed data relative to the sampling clock. Data interface 36 thereby de-skews any skew on the data signals and places the transitions at their proper locations in the optimal sampling regions (or time ranges) between corresponding pairs of the sampling clock transitions. In this manner, data interface 36 includes de-skewing mechanisms for optimally placing data transitions between sampling clock edges so that when a frame is formed, the frame will be accurate as to data transitions within a bit period, hereinafter noted as one half the sampling clock cycle since sampling occurs on each transition of the sampling clock. Data interface 36, therefore, operates on the receive port of the framer/mapper 30 by receiving data, de-skewing that data, and then presenting the de-skewed sampled data within the proper bit location for accurate framing by framer/mapper 30 as de-skewed, framed data 38.

The above communication system 10 and line card 16a are merely examples and not deemed to place limitations on the present data interface and mechanism for de-skewing data transitions relative to clock transitions. The data interface is preferably found within any system that utilizes a synchronous subsystem—regardless of whether a communication system is or is not involved. The data interface described herein below is used generically, and is not limited to a communication system, and certainly not to framers, line cards, or a SONET communication system protocol. Moreover, similar to the data signal, it is recognized that a clock signal can also be skewed. Thus the de-skew mechanism is directed to measuring the "relative" skewing between the clock transition and the data transition, regardless of whether the clock signal is skewed, the data signal is skewed, or both.

Figure 4:
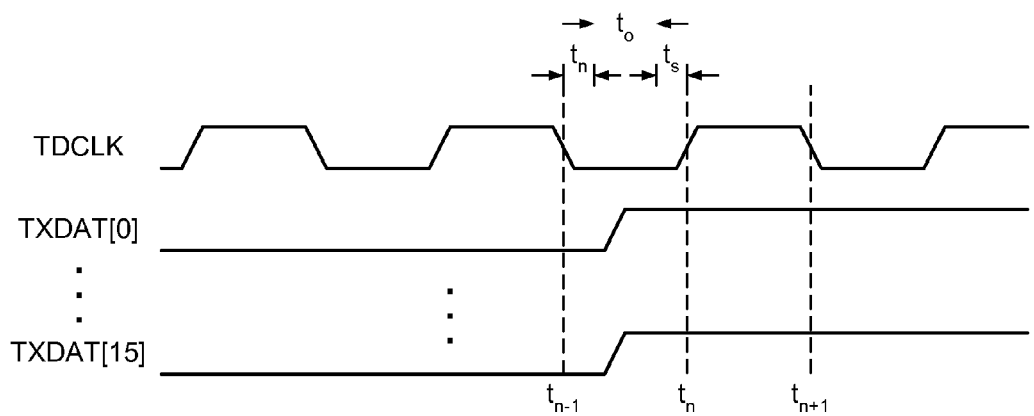
FIG. 4 is a timing diagram of data ideally received by sample circuitry of the framer/mapper of FIG. 3.

FIG. 4 illustrates optimal alignment between the parallel-fed data and the sampling clock. As shown, each transition within the parallel-fed data should optimally occur between sampling edges of the clock, after the hold time ($t_h$) and before the set-up time ($t_s$). Thus, an optimal alignment ($t_o$) exists between neighboring edges of the sampling clock.

Figure 5:
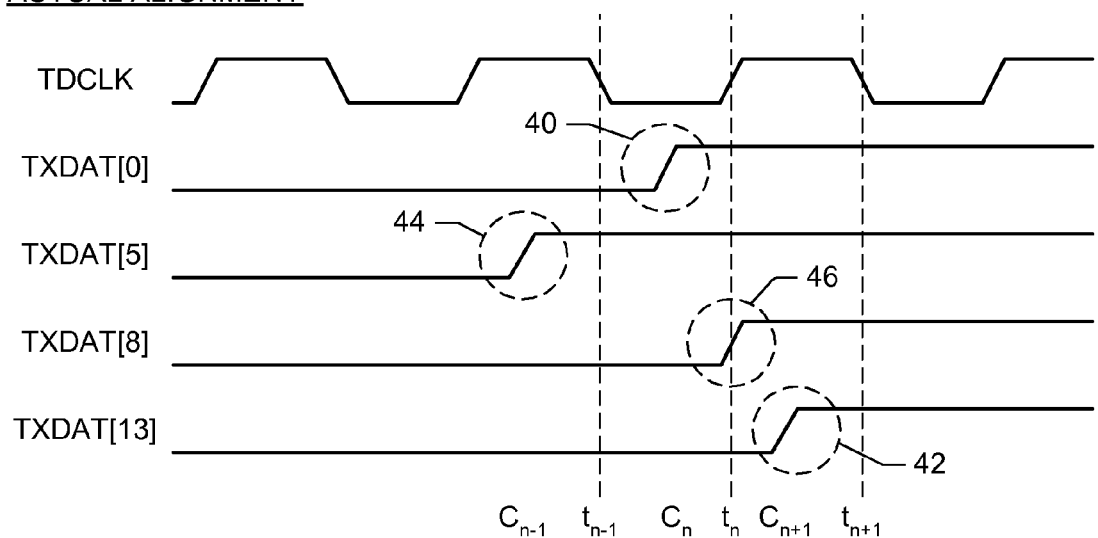
FIG. 5 is a timing diagram of data typically received by sample circuitry of the framer/mapper of FIG. 3, where skewing of data signals occurs among a set of data signals received by the sample circuitry within the data interface of the framer/mapper.

FIG. 5 illustrates what occurs when the data signals are skewed relative to the sampling clock. Reference numerals 40 and 42 indicate placement of corresponding data transitions at proper sampling positions within bit locations $C_n$ and $C_{n+1}$. It may be, however, that TXDAT[13] should be within bit $C_n$ location, yet is skewed to the next bit location $C_{n+1}$. This form of skewing is alternatively known as inter-bit skewing. While inter-bit skewing is a problem, there are numerous techniques that can be used to de-skew inter-bit skewing (i.e., skewing that occurs outside the desired bit location). However, sub-bit skewing is more problematic.

While inter-bit skew is shown in reference numerals 42 and 44, sub-bit skewing is shown by reference numeral 46. Instead of the transition on data signal TXDAT[8] being within the optimal range $t_o$, shown in FIG. 4, the transition edge 46 is delayed within the set-up time $t_s$, of bit $C_n$. The sampling clock cannot sample data signal transitions which occur in the hold time or set-up time forbidden areas. The sub-bit delay or skew of TXDAT[8] must, therefore, be de-skewed by either moving the transition backward in time (within bit $C_n$) or forward in time (within bit $C_{n+1}$). The present data interface 36 is designed to account for sub-bit skewing and can move the data signal transitions to the optimal time slot sampling range ($t_o$) even if one or more of the data signals is skewed into the forbidden sampling regions.

Figure 6:
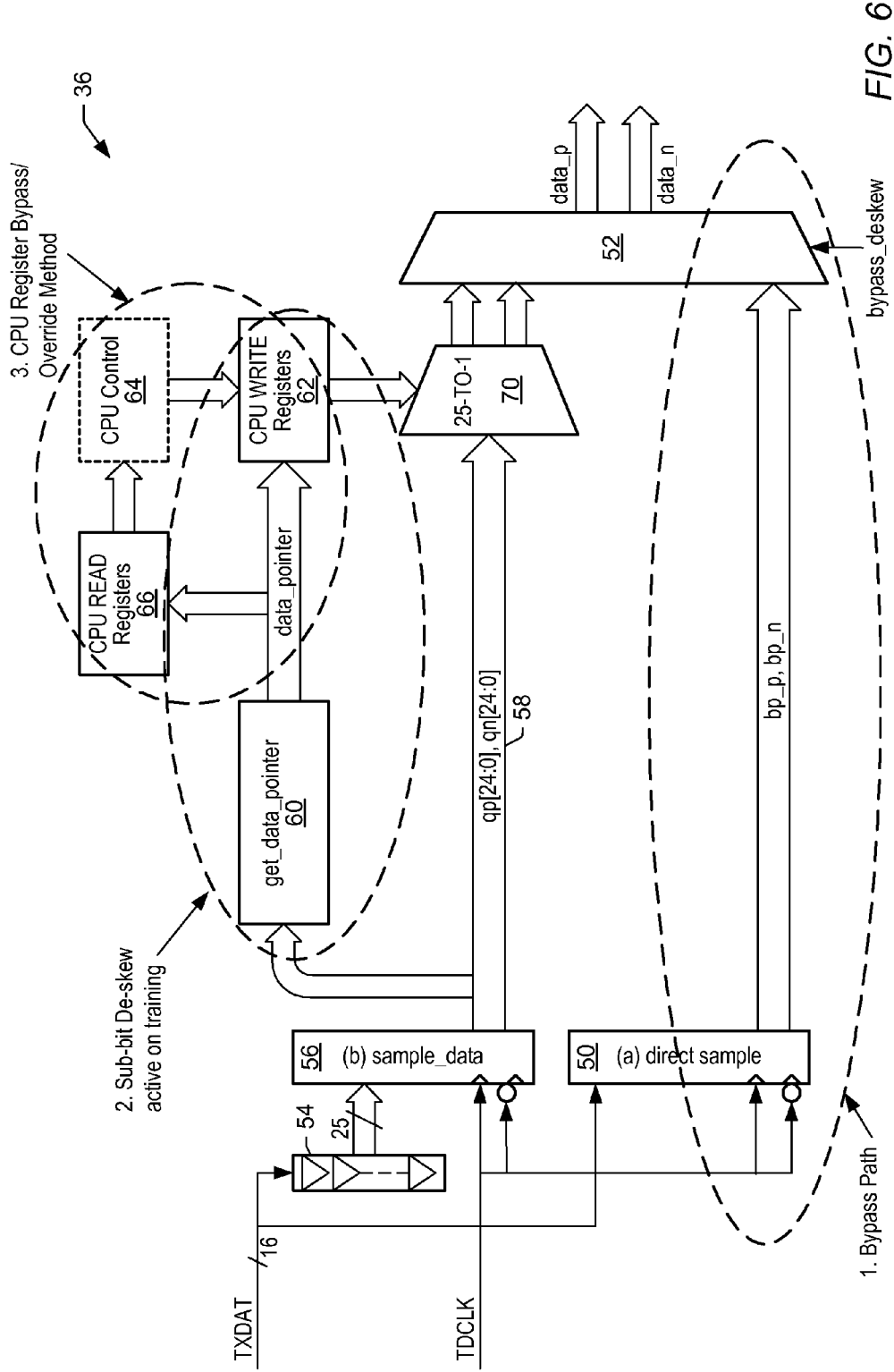
FIG. 6 is a block diagram of three modes of operation for the data interface, where the first mode is a bypass de-skew mode, the second mode is a SPI training de-skew mode, and the third mode is a SPI training de-skew with register override.

FIG. 6 illustrates data interface 36. More particularly, data interface 36 is shown operable in one of three different modes. According to a first mode, the parallel-fed data signals are equalized in delay before being sampled by the direct sample sequential logic block 50. Differences in skewing among the clock and data conductive paths of the parallel-fed data is programmably compensated for and equalized in a subsystem shown below in FIG. 7, prior to entry into direct sample logic block 50. A bypass command (i.e., bypass_deskew) is received on the selector input of multiplexer 52, causing the sampled data output from multiplexer 52 to be sent into the framer/mapper subsystem.

If the second mode is chosen, then each data signal is fed into a series of delay elements 54. For simplicity, only one series of delay elements 54 is shown. However, it is understood that delay elements 54 are coupled to each conductive path and, in the example of FIG. 6, there are 16 conductive paths which receive 16 signals which ideally are not skewed. Delay elements 54 presents multiple phase delays which sequentially increase from the first delay unit to the last delay unit which, in the example shown, includes twenty five (25) delay units per series. Accordingly, 25 conductive lines for each series of delay elements is presented to subsystem 56.

Like subsystem 50, subsystem 56 receives the sampling clock (TDCLK). All twenty five phases are output from subsystem 56 onto bus 58. To choose the proper data signal from the twenty five available, the sub-bit deskew calculation block 60 together with the 25:1 multiplexer 70 are employed. In this mode, block 62 functions as a transparent block, thereby providing a wire function. The second mode of operation thereby includes the sub-bit de-skew mechanism which relies on a data transition that occurs simultaneously across each of the parallel-fed data conductors. Any skewing within the line card or the framer/mapper itself, possibly caused by one conductor of the parallel conductor bus being longer or shorter than another, can be measured since it is assumed that the concurrent transition must have the same phase being read by sample subsystem 56. However, skewing imparts the transition edges of the clock reading dissimilar phase delay amounts for possibly each data signal. The second mode of operation is shown as a reference numeral "2" as opposed to the first mode of operation, shown as a reference numeral "1." Further details of the get_data_pointer block 60 will be described below in reference to FIG. 8.

The third mode of operation relies partially on the second mode of operation. However, instead of using the information from the get_data_pointer block 60, the third mode of operation, shown as reference numeral "3," can override subsystem 60 output with data stored in write register 62. Write register 62 can be modified through instructions sent in software via the CPU control block 64, or can be modified by data pointer values read by registers 66. If the second mode of operation is used, then the data pointer output from block 60 is read by registers 66 and simply forwarded to the write registers 62, which are thereafter used by a multiplexer 70 selector pin. However, if the override mode of operation is selected, then the data pointer values are overridden by values within write registers 62, and the values within write registers 62 are not necessarily those taken from read registers 66. Further details of the second and third modes of operation, including the override function, are set forth below in reference to FIGS. 12-14.

Figure 7:
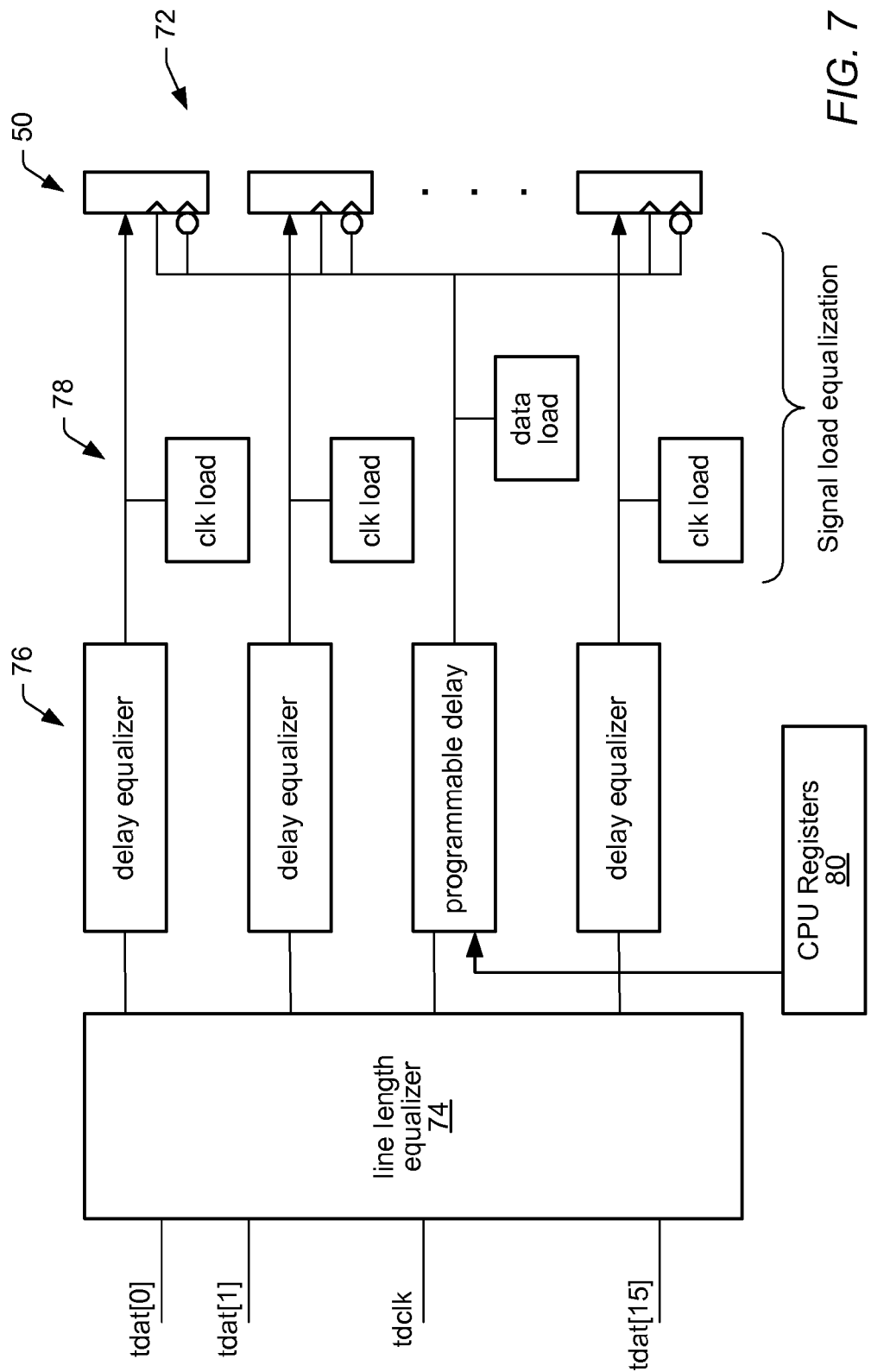
FIG. 7 is a block diagram of subsystems placed within the data interface to carry out the first mode of operation.

FIG. 7 illustrates the various subsystems used by the first mode of operation if selected by the user either in hardware or software. The subsystems 72 of the first mode of operation include a line length equalizer 74 and various delay equalizers 76. Line length equalizer 74 can be designed to physically match the layout of each of the data and clock lines, whereas a positive and negative clock signal transitions can be adjusted by programmable delay block of delay equalizers 76. The dissimilar positive and negative clock pulses are then used by flip-flops 50 clocking inputs. Various loads can be applied to the clock and data lines, as shown by reference numeral 78.

The overall net effect of system 72 is to equalize the delay and thereby de-skew any skewing disparity on the conductive lines before forwarding the data signals to the direct sample block 50. In this manner, de-skewing occurs before the sampling operation and thereby the training, get_pointer operation, and override function of the second and third modes of operation can be simply bypassed, as shown in FIG. 6.

De-skewing before the sample operation certainly would be most optimal if, indeed, the designer would know how much de-skewing to impart on each of the parallel-fed data lines. However, this is not always possible and certainly not possible over a rather long amount of time. While skewing can be modeled for a particular moment in time, it is generally recognized that skewing will change over time depending on loading factor changes, operating temperature changes, and/or semiconductor fabrication fluctuations. It is, therefore, necessary to devise the second mode of operation to take into account skew variations over time.

Figure 8:
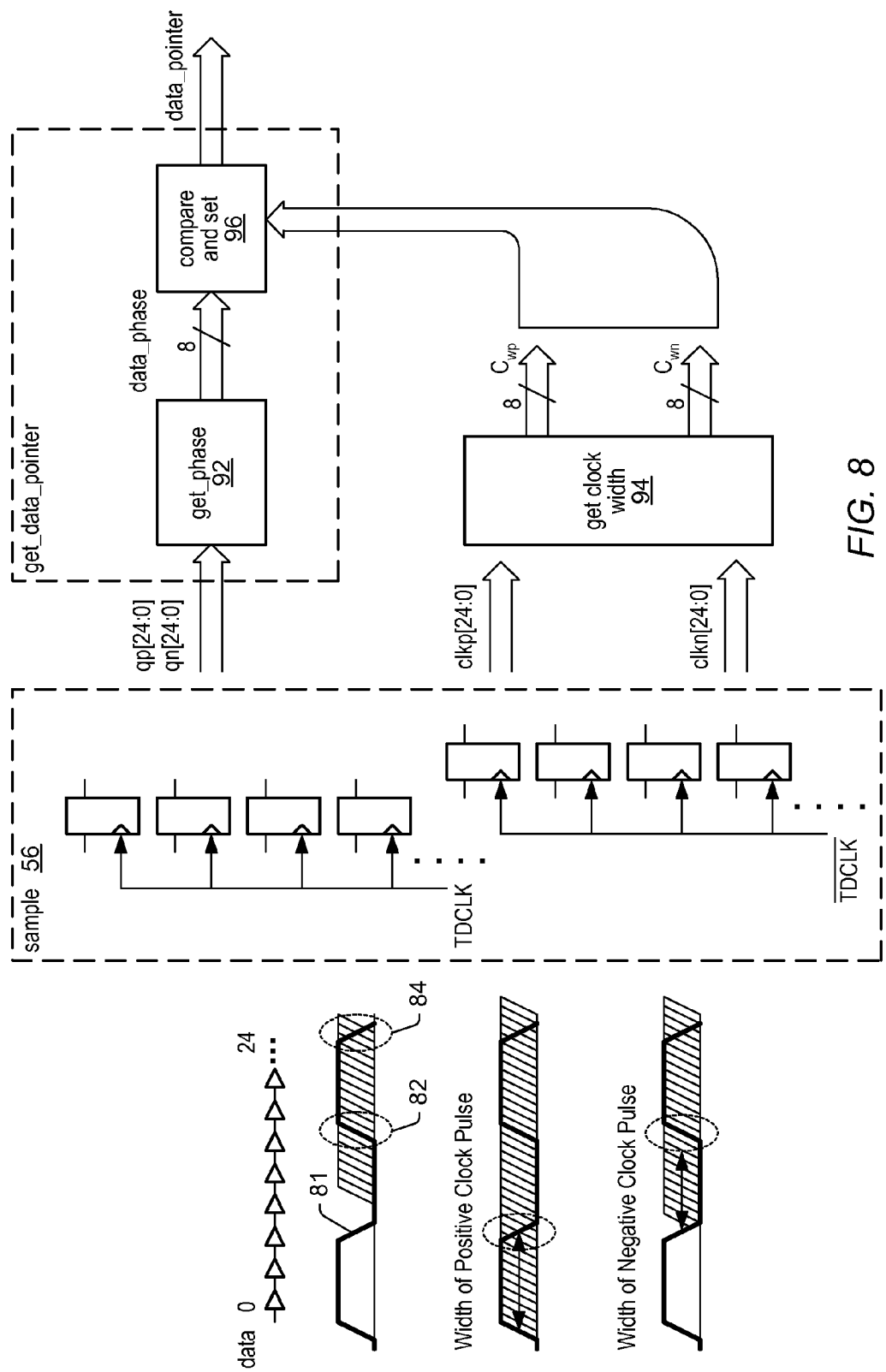
FIG. 8 is a block diagram of subsystems placed within the data interface to carry out the second mode of operation.

In the second mode of operation, shown in FIG. 8, a training pattern is periodically sent across the parallel-fed data lines. The training pattern consists of simultaneously sending a transition at the same time across at least a portion of the plurality of data lines. The sampling edges of the clock signal will sample the entire data line producing 25 samples. The samples are then presented to the get_phase block 92, which notes the relative position of the data samples and the clock edges by recording the data_phase value derived from the first samples of the data line (i.e., from rising or falling edges of the clock). The clock waveform is shown as reference numeral 81, which might note a phase delay number of eight for the first data signal, but possibly a delay number twenty for the second reference number at the first or second transitional edges of the clock signal, as shown by reference numerals 82 and 84. The phase delay number of eight is then sent on possibly the eighth conductor of the qp[24:0] bus if the positive going edge forms the sample, and the phase delay number twenty might appear on the twentieth conductor of the qn[24:0] bus attributed to the second data signal if the twentieth phase is sampled by the negative going edge 84.

Not only is the phase delay number associated with a clock edge output from sample block 56, but also the phase delay number at the positive and negative going edges 82 and 84, as they appear on the corresponding qp and qn outputs. The phase delay number for both the positive and negative edges is kept track of since the duty cycle of the clock signal can change over time. As the width of the positive clock pulse decreases, it is important to note that decrease along with any decreases (or increases) in the negative clock pulse. Thus, both the positive and negative edges of the clock signal are used to sample the zero through n phases (where n is preferably 24) in order to determine not only the phase delay number, but a number associated with both the positive clock pulse width and the negative clock pulse width. Determining the positive clock pulse width simply involves subtracting the data phase number for the clock positive going edge from the data phase number of the clock negative going edge. Likewise, determining the width of the negative clock pulse simply involves subtracting the phase delay number at the negative going edge of the clock from the phase delay number at the positive going edge of the clock.

FIG. 8 thereby illustrates a data phase count relative to the positive and negative edges as qp[24:0] or qn[24:0]. At the same time, the width of the positive clock pulse (clkp[24:0]) and the width of the negative clock pulse (clkn[24:0]) are also noted. The combination of the phase delay number at the transitory edges of the clock (i.e., data phase count) and the clock positive and negative pulse widths are combined, noted by reference numeral 90. For example, the data phase count could be three as registered within block 92 (i.e., the third phase delay number). The data phase count of three is combined with possibly a positive pulse clock width phase count of twelve. Knowing the pulse width and the amount of delay relative to the positive going edge of the clock signal will then indicate where, within the positive pulse width, to place the respective data transition. This may entail subtracting a certain number of phase delay counts from the data phase count depending on the clock width phase count to arrive at possibly a final data phase count of zero rather than, for example, three. The comparison and set function for defining the final, optimal data phase count is conducted within block 96. Further details of the compare and set function 96 is set forth in FIGS. 9-11, which follow.

Figure 9:
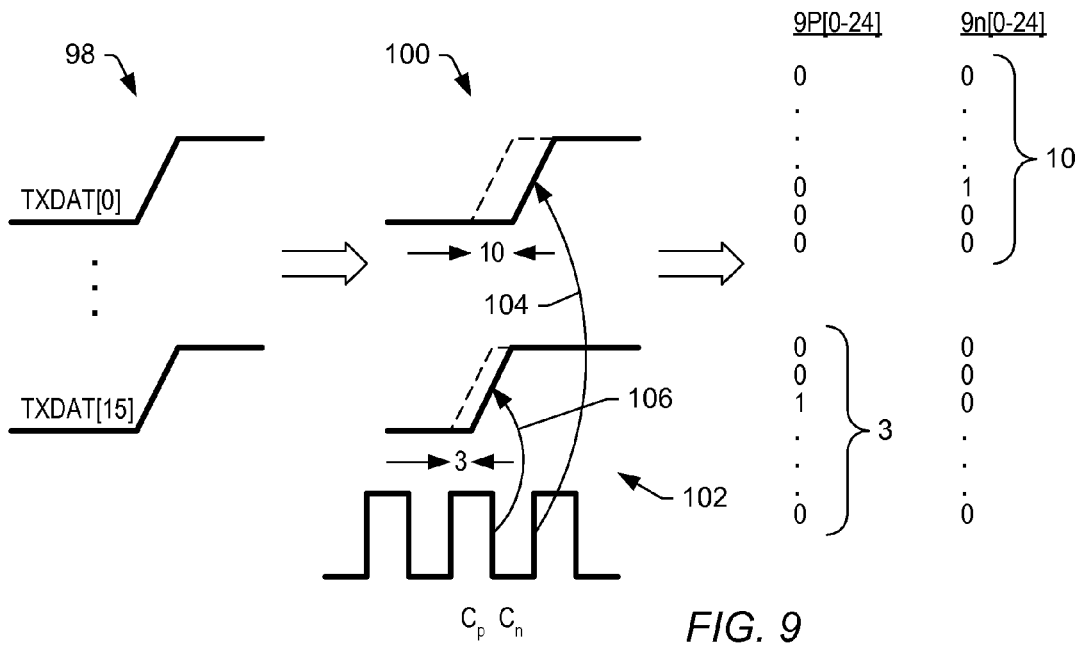
FIG. 9 is a timing diagram of sequentially delayed phases for each data signal having a data phase count corresponding to the number of data phases expired until a data phase occurs during a sampling edge of the a clock signal.

FIG. 9 illustrates how qp and qn data phase numbers are derived using dissimilar delay examples of one data signal (TXDAT[0]) from another data signal (TXDAT[15]). While the training pulse 98 occurs at the same time for both data signals, skew occurs within the conductors causing a greater delay in the first data signal 100 than in the second data signal 102. In the example shown, the phase delay number 10 is determined on a positive going clock edge 104, while a phase delay number 3 is determined on a negative going clock edge 106. The phase delay number 10 for data signal 100, therefore, appears in the negative pulse region (qn) and, particularly, on the tenth bit location. Similarly, for data signal 102 the phase delay number 3 appears on the third bit location (or third conductor) on the positive pulse region (qp) designed bus. The get_Phase block of FIG. 8 can then further encode the qp bus (25 bits) and the qn bus (25 bits) into an 8 bit bus (data_phase)—i.e., onto possibly eight conductors as a bit value of 10 and a bit value of 3.

Figure 10:
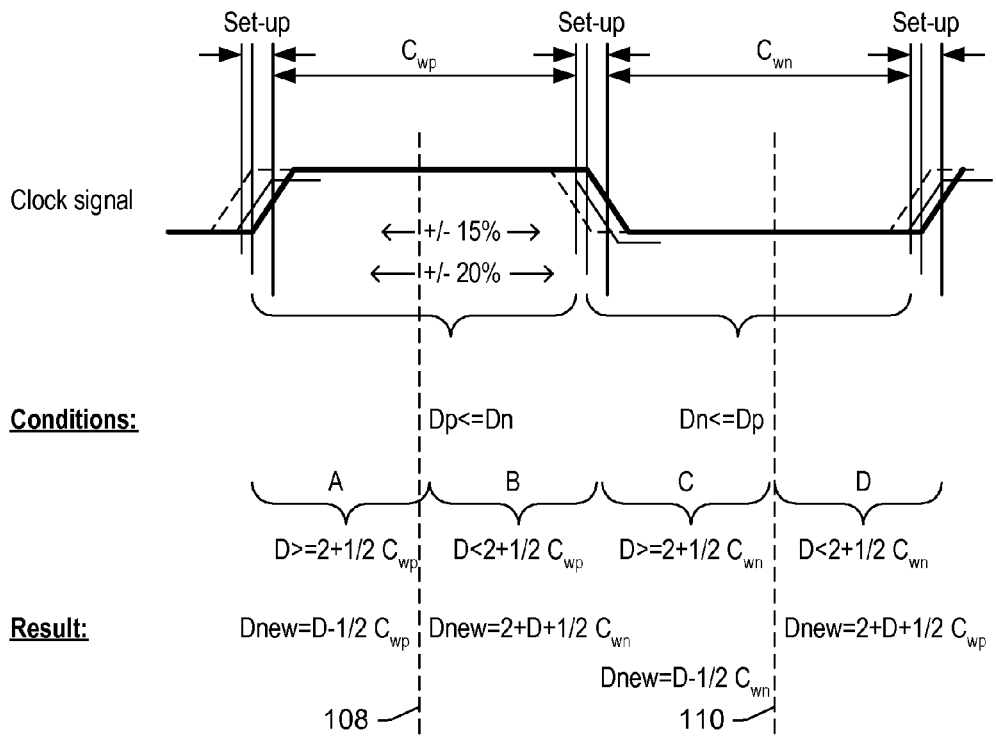
FIG. 10 is a timing diagram of the mechanism used to count the number of data phases between sampling edges of the clock signal to determine a clock width count, and for combining the clock width count and the data phase count to determine an optimal sub-bit placement of the data signal transitions between clock edges for each data signal.

FIG. 10 illustrates the decision process involved in the compare and set block 96 of FIG. 8. In particular, a decision must be made on which phase to use from among possibly 25 phases, as well as where to adjust the data transition based on possibly dissimilar positive and negative clock pulse width phase counts. The clock pulse widths are calculated based on the number of phases being counted between clock edges and, more particularly, the midpoint of those edges minus one set-up time as shown. If the data signal transition D prior to skew is in region A, then any sub-bit skewing within the positive clock pulse ($C_{wp}$) occurs by subtracting one half the positive clock pulse width phase from the phase count number to determine the new phase count (Dnew). That new phase count will be approximately near the midline point 108. If, however, the data signal transition D is in region B prior to skewing, then ½ the clock width phase count must be added to place the new data transition in the next bit location ($C_{wn}$). A number of phases can be added to account for set-up time of the sampling subsystem or flip-flop within sample block 56. The final data transition position would, therefore, be at midpoint 110 for original data transitions in region B. A better understanding of the decision process can be obtained by using an example.

Figure 11:
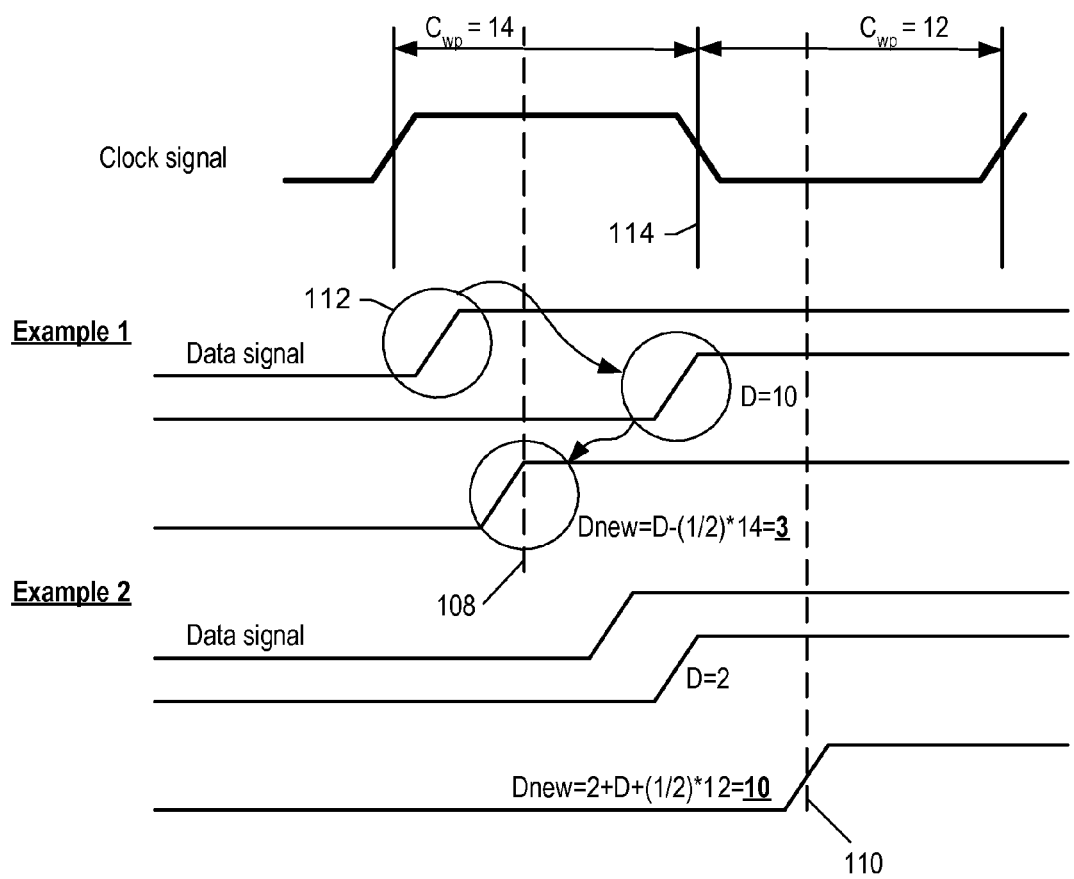
FIG. 11 is timing diagram of an example in which a pair of data signals having dissimilar skewing are re-aligned to an optimal sampling location between corresponding clock edges.

FIG. 11 illustrates an example where the original data transition D is in region A, as shown by reference numeral 112. However, the phase delay number 10 is noted at clock edge 114 due to the phase delays imparted by the series delay elements. However, since the original data transition as shown by reference numeral 112 is in region A, then the data phase count of 10 is adjusted by subtracting one half the clock width phase count for $C_{wp}$, thereby making the new data phase count equal to 3 at midpoint 108.

Example 2 illustrates an original data signal transition D in region B. Instead of subtracting one half the positive pulse width, one half the negative pulse width is added to the data phase count of 2. Furthermore, a set-up time of 2 data phase counts are added to the computation to form the new data phase count of 10, thereby placing the new data signal transition at midpoint 110.

Figure 12:
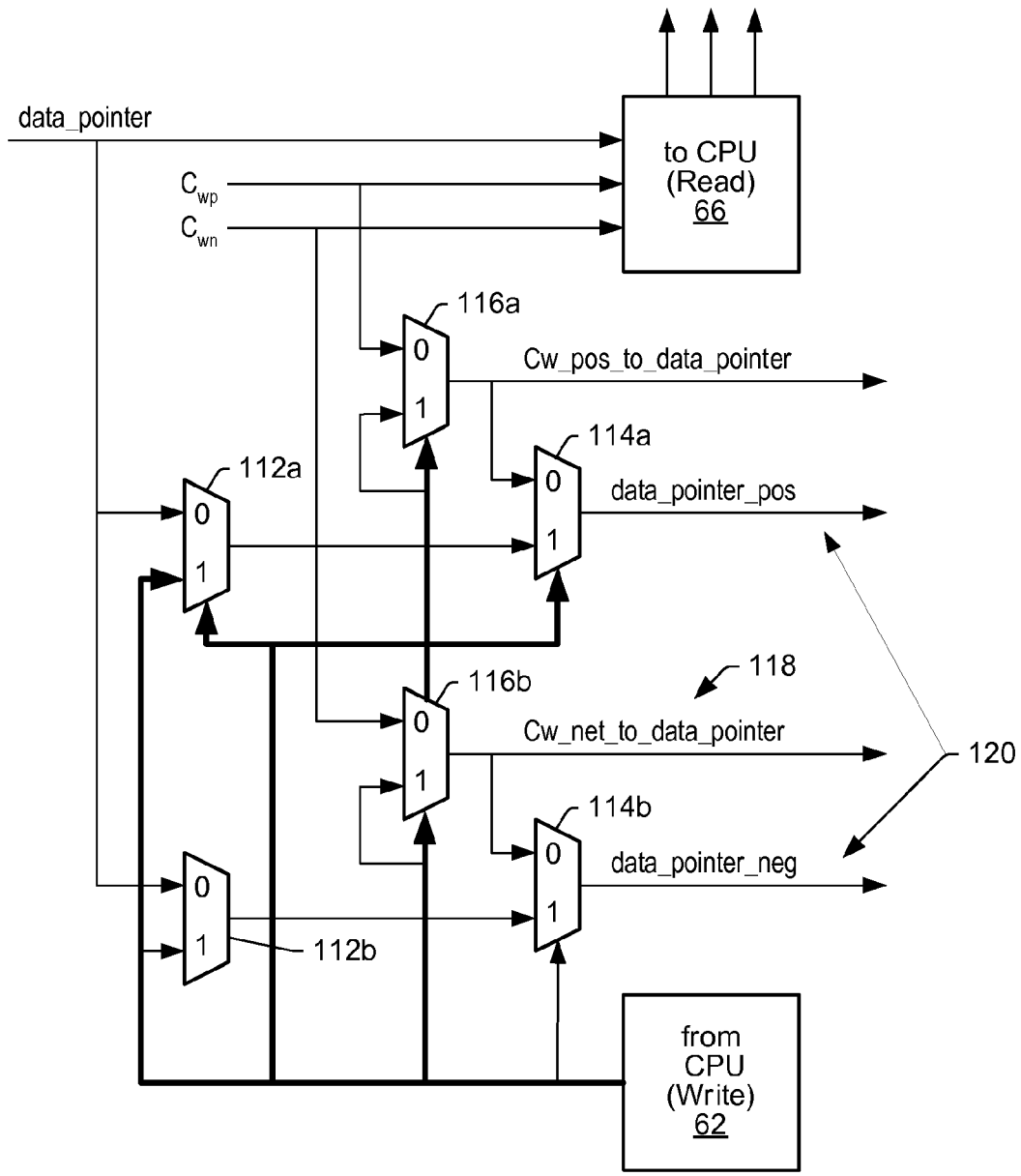
FIG. 12 is a block diagram of multiplexers used to take the optimal sub-bit placement values (data pointer) derived in accordance with the second mode of operation, or to take another placement value stored within writeable registers to programmably override the data pointer values according to the third mode of operation.
Figure 13:
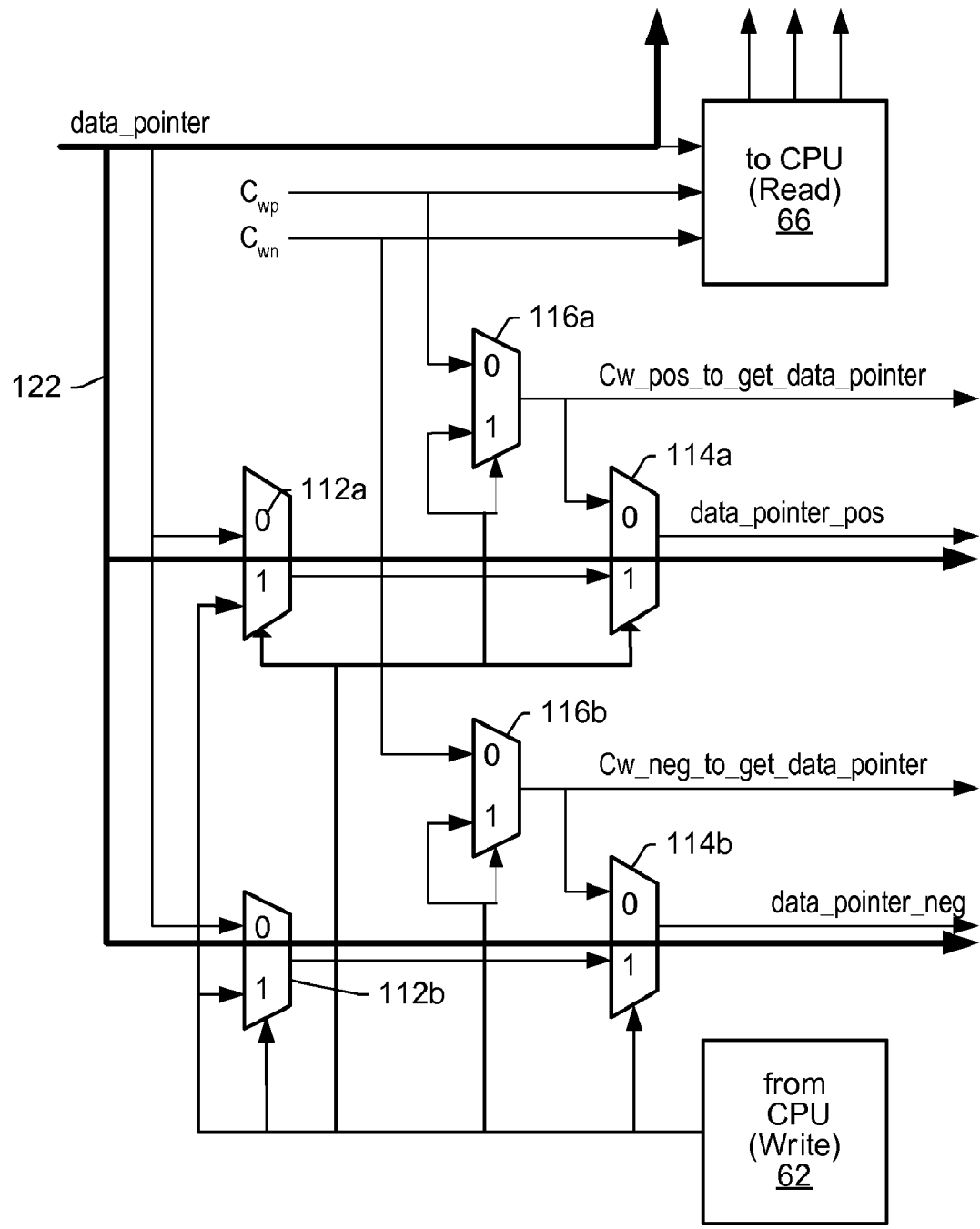
FIG. 13 is a block diagram of the multiplexers of FIG. 12 operating according to the second mode of operation.

Referring to FIGS. 12-13, a third mode of operation is shown. The third mode of operation can override an outcome from the second mode of operation. The de-skew method in which a training pattern is used applies only to the second mode of operation. Absent a proper training pattern, the second mode of operation cannot function, and a data_pointer rest occurs only when a training pattern is detected on the data interface. Between training pattern occurrences, the data_pointer remains static. FIG. 12 illustrates a register interface comprising read and write registers 66 and 62 (see also FIG. 6). Read register 66 receives the get_pointer information from the get_pointer block (shown in FIG. 6). Get_pointer information (i.e., the data phase count) is placed within read register 66 under CPU control. Additionally, the clock width phase count for both the positive and negative pulses (i.e., $C_{wp}$ and $C_{wn}$) are also read by register 66 under CPU control. The data phase count can be selected by multiplexers 112 and, furthermore, the final data phase count for each data transition can be selected by multiplexers 114, taking into account the clock width phase count selected from multiplexers 116. If, however, the third mode of operation is chosen, then the data phase count and the clock width phase count can be overridden by the value stored within write register 62. Thus, a new data phase count value can be selected by multiplexers 112 from write register 62, and the clock width phase count can be selected from register 62 by multiplexers 116. The combination of data phase count and clock width phase count values from register 62 can also be selected by multiplexers 114 as the final transition location for the respective data signals. Therefore, line items 118 represent the clock width values that can be overridden by the CPU write register 62, and line items 120 is the data pointer value fed into multiplexer 70 (shown in FIG. 6). Items 120, similar to items 118, can be overridden by values within the CPU write register 62.

Figure 14:
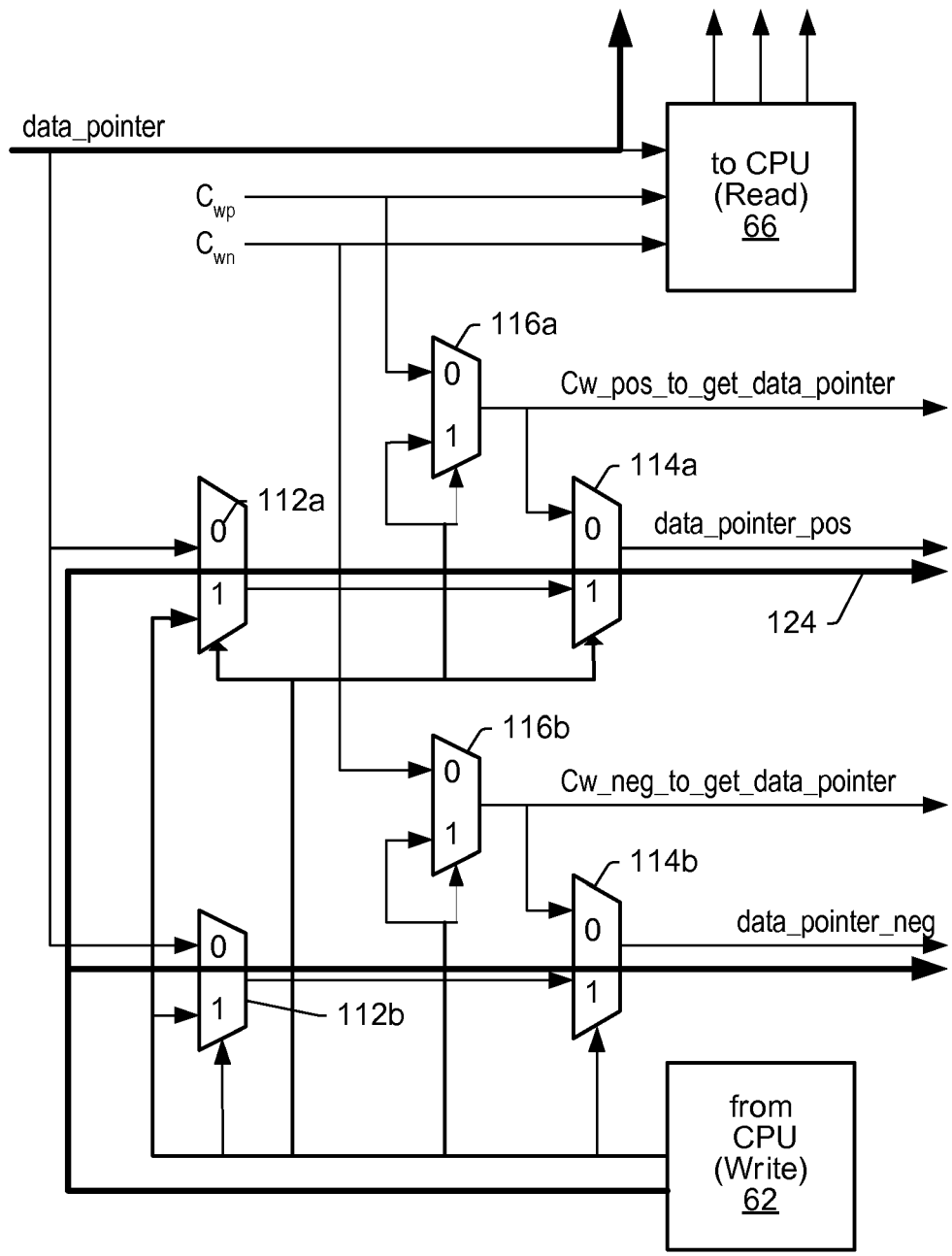
FIG. 14 is a block diagram of the multiplexers of FIG. 12 operating according to the third mode of operation.

FIG. 13 illustrates multiplexers 112-116 configured to select sub-bit de-skewing using the second mode of operation, as indicated by the darkened arrows 122. However, as shown in FIG. 14, the data phase count and clock width phase counts can be overridden by values within write register 62, and those values can be read out by the selected multiplexers 112-116 according to the flow shown by darkened arrows 124. Even though the overridden value is to be used by multiplexer 70 (shown in FIG. 6), the data phase count established during the training session is still read by the read register 66.

It will be appreciated to those skilled in the art having the benefit of this disclosure that the various embodiments herein are believed to be capable of performing three modes of data de-skewing. The de-skewing mechanism is used in any synchronous system environment where data transitions are to be synchronized to clock edges. An example of such an environment might be a communication system involving the framing or mapping of data to and from a packet or frame. However, de-skewing is not limited to a communication system and, certainly, not to a packet-over-SONET framer/mapper. It is intended that the following claims be interpreted to embrace all such modifications and changes and, accordingly, the specification and drawings are to regarded in an illustrative rather than a restrictive sense.

What is claimed is:

1. A data interface, comprising:
    a port adapted to receive a plurality of data signals and a clock signal, wherein the plurality of data signals are present on corresponding ones of all conductors among a parallel bus, and wherein the plurality of data signals transition at dissimilar times between a successive pair of transitions of the clock signal, and the plurality of data signals are sampled during each of the pair of transitions of the clock signal; and
    an alignment mechanism adapted to operate in dissimilar modes of operation to adjust transition of the plurality of data signals occurring exclusively between the successive pair of transitions of the clock signal to occur within a time range between the pair of transitions of the clock signal.

2. The data interface as recited in claim 1, wherein the time range is plus and minus 20% of a duration between the pair of transitions of the clock signal from a midpoint between the pair of transitions.

3. The data interface as recited in claim 1, wherein the time range is plus and minus 15% of a duration between the pair of transitions of the clock signal from a midpoint between the pair of transitions.

4. The data interface as recited in claim 1, wherein the time range is approximately equal for each transition of the plurality of data signals.

5. The data interface as recited in claim 1, wherein the port is a receive port of a framer.

6. The data interface as recited in claim 1, wherein the alignment mechanism is operable during a first mode of operation to include:
- a delay equalizer coupled to receive the plurality of data signals and the clock signal; and
- a programmable register coupled to forward configuration values to the delay equalizer to adjust the transition of the plurality of data signals.

7. The data interface as recited in claim 1, wherein the alignment mechanism is operable during a second mode of operation to include:
- a series of delay elements configured to receive each of the plurality of data signals, wherein each of the series of delay elements includes an output that when combined with the remaining outputs from the delay elements forms a sequentially increasing phase delay number;
- sample logic coupled to generate a data phase count corresponding to the phase delay number sampled during a transition of the clock signal; and
- set logic coupled to pick a new data phase count at which the transition of each of the plurality of data signals is to reside by either adding to or subtracting from the data phase count a phase delay number that places the transition of each of the plurality of data signals at approximately a midpoint between transitions of the clock signal.

8. The data interface as recited in claim 7, wherein the sample logic is further coupled to generate a clock width phase count corresponding to the difference between the phase delay number sampled at each of the pair of transitions of the clock signal, and wherein the set logic is further coupled to pick the new data phase count by adding to or subtracting from the data phase count a phase delay number that is one half the clock width phase count.

9. The data interface as recited in claim 8, wherein the clock width phase count is dissimilar for the positive pulse width and the negative pulse width of the clock signal.

10. The data interface as recited in claim 1, wherein the alignment mechanism is operable during a third mode of operation to include:
- a series of delay elements configured to receive each of the plurality of data signals, wherein each of the series of delay elements includes an output that when combined with the remaining outputs from the delay elements forms a sequentially increasing phase delay number;
- sample logic coupled to generate a data phase count corresponding to the phase delay number sampled during a transition of the clock signal; and
- a register coupled to combine configuration values to each data phase count of the plurality of data signals to pick a new data phase count at which the transition of each of the plurality of data signals at approximately a midpoint between transitions of the clock signal.

11. A communication system, comprising:
- a plurality of conductors;
- a series of delay elements coupled to each of the plurality of conductors for producing a sequentially increasing phase delay number corresponding to sequentially increasing outputs taken from the series of delay elements;
- a data pointer select circuit adapted to select a phase delay from among the series of delay elements and adjust the selected phase delay to correspond to approximately a midpoint between a pair of transitions of a clock signal, wherein the data pointer circuit comprises:
  - sample logic coupled to generate a data phase count corresponding to the phase delay number sampled during a transition of the clock signal; and
  - set logic coupled to pick a new data phase count at which the transition of each of the plurality of data signals is to reside by either adding to or subtracting from the data phase count a phase delay number that places the transition of each of the plurality of data signals at approximately a midpoint between transitions of the clock signal; and
- wherein the plurality of conductors reside on a framer adapted to receive the clock signal and a plurality of transmit signals sent from a system packet interface, and wherein the transmit signals are periodically sent from the system packet interface during a training session in which all of the plurality of transmit signals transition to a dissimilar logic value during one half cycle of the clock signal.

12. The communication system as recited in claim 11, wherein the sample logic is further coupled to generate a clock width phase count corresponding to the difference between the phase delay number sampled at each of the pair of transitions of the clock signal, and wherein the set logic is further coupled to pick the new data phase count by adding to or subtracting from the data phase count a phase delay number that is one half the clock width phase count.

13. The communication system as recited in claim 12, wherein the clock width phase count is dissimilar for the positive pulse width and the negative pulse width of the clock signal.

14. A method for de-skewing a data signal, comprising:
- delaying the data signal an increasing amount;
- assigning a data phase count when the delayed data signal is sampled by a transition of a clock signal;
- adjusting the data phase count based on a clock width phase count of the clock signal; and
- picking a transition of the data signal corresponding to the adjusted data phase count.

15. The method as recited in claim 14, wherein said adjusting comprises:
- calculating the difference between a data phase count between a pair of transitions of the clock signal;
- using that difference as the clock width phase count;
- adding approximately one half the clock width phase count to the assigned data phase count if the data signal prior to said delaying is within a setup time of a transition of the clock signal; and
- subtracting approximately one half the clock width phase count to the assigned data phase count if the data signal prior to said delaying is prior to a setup time of a transition of the clock signal.

* * * * *